US012791480B2

(12) United States Patent
Lussier et al.

(10) Patent No.: US 12,791,480 B2
(45) **Date of Patent: *Nov. 10, 2026**

(54) METHOD OF DETECTING FLUORESCENT IMAGE IN ARTICLES

(71) Applicant: Eastman Kodak Company, Rochester, NY (US)

(72) Inventors: Barbara Boland Lussier, Rochester, NY (US); Douglas Eugene Bugner, Rochester, NY (US); Mark Edward Irving, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 564 days.

This patent is subject to a terminal disclaimer.

(21) Appl. No.: 17/944,474

(22) Filed: Sep. 14, 2022

(65) Prior Publication Data

US 2024/0102929 A1 Mar. 28, 2024

(51) Int. Cl.
*G01N 21/64* (2006.01)
*C09D 11/322* (2014.01)
(Continued)

(52) U.S. Cl.
CPC ....... *G01N 21/6428* (2013.01); *C09D 11/322* (2013.01); *C09D 11/50* (2013.01); *G01N 2021/6439* (2013.01)

(58) Field of Classification Search
CPC ....... G01N 21/6428; G01N 2021/6439; G01N 21/643; G01N 21/6456; C09D 11/322;
(Continued)

(56) References Cited

U.S. PATENT DOCUMENTS 6,664,027 B2 12/2003 Griffith et al.
6,793,723 B2 9/2004 Auslander et al.
(Continued)

FOREIGN PATENT DOCUMENTS

| | | | |
|---|---|---|---|
| JP | 2003155429 | A | 5/2003 |
| JP | 2012167222 | A | 9/2012 |
| KR | 20210003544 | A | 1/2021 |

OTHER PUBLICATIONS

Howlad in DE-102010018364 (English translation). 2011. (Year: 2011).*

*Primary Examiner* — Rebecca M Fritchman
(74) *Attorney, Agent, or Firm* — J. Lanny Tucker

(57) ABSTRACT

A fluorescent colored image can be detected in an image on an article. This fluorescent colored image is obtained from applying an aqueous colored pigment-based ink that is capable of fluorescence, onto a suitable non-UV fluorescent substrate. This aqueous colored pigment-based ink has 1-7 weight % of a pigment colorant; and 0.1-2 weight % of a non-polymeric fluorophore that when excited by fluorescence-exciting radiation having a peak of at least 200 nm and up to and including 400 nm, exhibits an emission peak of at least 400 nm and up to and including 750 nm. This aqueous colored pigment-based ink that is capable of fluorescence can be applied using inkjet printing, onto non-UV fluorescent substrates to provide images that can be detected when excited as noted above, which images can be provided on articles such as security documents, currency, and lottery tickets.

9 Claims, 2 Drawing Sheets

(51) Int. Cl.
*C09D 11/50* (2014.01)
*C09D 11/38* (2014.01)

(58) Field of Classification Search
CPC ..... C09D 11/50; C09D 11/326; C09D 11/328; C09D 11/38; B42D 25/387; G07D 7/1205; B41M 3/144
See application file for complete search history.

(56) References Cited

U.S. PATENT DOCUMENTS

| | | | |
|---|---|---|---|
| 6,827,769 | B2 | 12/2004 | Auslander et al. |
| 6,905,538 | B2 | 6/2005 | Auslander |
| 8,349,211 | B2 | 1/2013 | Cai |
| 9,016,850 | B1 | 4/2015 | Pawlik et al. |
| 9,067,448 | B2 | 6/2015 | Dannhauser et al. |
| 9,126,433 | B2 | 9/2015 | Pawlik et al. |
| 9,427,975 | B2 | 8/2016 | Bugner et al. |
| 9,556,347 | B1 | 1/2017 | Cook |
| 9,663,669 | B1 | 5/2017 | Cook |
| 9,828,513 | B2 | 11/2017 | Lussier et al. |
| 2003/0041774 | A1 | 3/2003 | Auslander et al. |
| 2004/0233465 | A1 | 11/2004 | Coyle et al. |
| 2004/0241424 | A1 | 12/2004 | Barbera-Guillem |
| 2005/0279247 | A1 | 12/2005 | Auslander |
| 2005/0279248 | A1 | 12/2005 | Auslander |
| 2006/0293409 | A1 | 12/2006 | Sanchez et al. |
| 2008/0163777 | A1 | 7/2008 | Bock |
| 2009/0038507 | A1 | 2/2009 | Akers, Jr. et al. |
| 2014/0231674 | A1* | 8/2014 | Cook ......................... B41J 2/02 252/301.16 |
| 2017/0283635 | A1* | 10/2017 | Cook ................... C09D 11/107 |
| 2020/0399834 | A1* | 12/2020 | Reed .................... D21H 19/385 |
| 2021/0146708 | A1* | 5/2021 | Katsuragi ............ C09D 11/322 |

* cited by examiner

METHOD OF DETECTING FLUORESCENT IMAGE IN ARTICLES

REFERENCE TO RELATED APPLICATIONS

Reference is made to the following related U.S. Patent Applications:

U.S. Ser. No 17/944,354, filed on Sep. 14. 2022, by Lussier, Bugner, and Irving, and entitled "Fluorescent Ink and Ink Sets Containing Same";

U.S. Ser. No. 17/944,383, filed on Sep. 14, 2022, by Lussier, Bugner, and Irving and entitled "Method of Inkjet Printing Fluorescent Ink"; and U.S. Ser. No. 17/944,448, filed on Sep. 14, 2022, by Lussier, Bugner, and Irving and entitled "Method of Continuous Inkjet Printing Fluorescent Ink".

FIELD OF THE INVENTION

This invention relates to the field of inkjet printing. More particularly, it relates to methods of detecting fluorescent images in various articles, which images are obtained by applying aqueous colored pigment-based inks (but especially aqueous black pigment-based inks) to a non-UV fluorescing substrate. Such fluorescent images that can exhibit fluorescence upon suitable fluorescence-excitation. Such images can be provided by inkjet printing including continuous inkjet printing.

BACKGROUND OF THE INVENTION

It is well known to deposit aqueous inks, including aqueous colored pigment-based inks on various substrates using inkjet printing methods and apparatus. Inkjet printing is a standard method for printing such images wherein a stream of ink droplets is directed from a printing device to a surface of a suitable receiver element or substrate. The stream of droplets can be controlled using various means to print the desired image or information without required contact between the printing device and the surface to which the ink is to be applied.

There is a need for printing variable data such as security codes, symbols, or other alphanumeric indicia onto valuable documents such as lottery tickets, currency, stock certificates, bank checks, passports, and other security or legal documents that usually comprise special security paper substrates. Such printed data are usually easily visible to the naked eye. Variable data printing can be economically and safely carried out using inkjet printing systems that utilize water-based (aqueous) inks. For example, it is desired to print such variable data using an aqueous black ink that exhibits high optical density and is resistant to smearing or removal in either a wet or dry state. To achieve high optical density and resistance to smearing, aqueous pigment-based inks are desired over aqueous dye inks.

Various aqueous colored pigment-based inks have been developed for both drop-in-demand (DOD) and continuous inkjet (CIJ) printing systems. DOD printing systems are widely used in home or consumer inkjet printers and slower consumer printers. As the name implies, DOD inkjet printing uses a print head that ejects drops of ink only when signaled to do so by a digital controller.

CIJ printing systems generally comprise two main components, a fluid system (including one or more ink reservoirs) and one or more print heads. Ink can be pumped through a supply line from the ink reservoir to a manifold that distributes the ink to a plurality of orifices, typically arranged in linear array(s), under sufficient pressure to cause ink streams to continuously issue from the orifices of the print head(s). Stimulations can be applied to the print head(s) to cause those ink streams to form streams of uniformly sized and spaced drops, which are deflected in a suitable manner into printing and non-printing paths. Non-printing drops are generally returned to the ink reservoir using a drop catcher and a return line.

Inks of all colors can be specifically designed for either or both DOD and CIJ systems. It can require inventive effort to find the desired components and ink characteristics for either or both DOD and CIJ inkjet printing. This is true for color pigmented inks of various types that may be desired for security printing as noted above.

Fluorescent inks comprising water-soluble dyes have been developed for printing a security mark, images, or other information on security documents. For example, U.S. Pat. No. 8,349,211 (Cai) describes fluorescent inkjet ink compositions including a fluorescent dispersion.

Various schemes for incorporating security features in water-based pigment inks have been proposed in the inkjet printing art. For example, U.S. Pat. No. 9,016,850 (Pawlik et al.) describes a water-based inkjet ink that incorporates a first black pigment colorant and a second sublimable or diffusible colorant. After this ink is inkjet-printed onto the surface of a substrate, the sublimable or diffusible colorant can migrate through the substrate to the opposite surface under the influence of heat to produce a visible reverse image on the opposite surface of the document. While a suitable black image of high optical density and wet rub resistance can be obtained, which can be subsequently authenticated by exposing the printed document to heat with near-infrared radiation, once exposed to heat, the document is permanently altered.

U.S. Patent Application Publication 2004/0233465 (Coyle et al.) discloses solvent-based inkjet inks containing UV-fluorescent colorants that are invisible to the eye when viewed under visible light, but which emit a variety of visible colors when exposed to UV light. Methods are disclosed for reproducing dark colors (such as black) for use with types of paper that contain optical brighteners. To create a "black" color on a substrate that contains optical brighteners, a colorless ink containing one or more fluorescent quenchers in the ink can be used to quench the bluish white fluorescent optical brightening effect created by the optical brighteners. In such embodiments, the "black" color is not visible to the eye, but rather appears "black" only when viewed under UV illumination due to the fact that it blocks the bluish white fluorescence of the optical brighteners present in the substrate. Likewise, the invisible fluorescent inks can be printed onto a substrate with no optical brighteners present, resulting in a black background when viewed under UV illumination. In either case, the black color is not visible to the eye when exposed to visible light, but only appears black when viewed under UV illumination relative to the visible light emitted by the UV fluorescent inks.

U.S. Patent Application Publication 2014/0231674 (Cook) describes water-based inkjet inks comprising colorless UV-fluorescent pigment particles that exhibit good water resistance and light fastness. These inkjet inks can additionally comprise one or more non-fluorescent colored pigments other than carbon black. Thus, although these inkjet inks can result in visible markings on documents that can also exhibit a distinct visible fluorescence when exposed to UV light, they cannot be used for printing black indicia with high optical density. This is because black pigments, especially carbon black, absorb strongly throughout the UV region of the spectrum and therefore prevent sufficient UV radiation from being absorbed by the fluorescent pigment to generate visible fluorescence. Using a lower concentration of the black pigment can alleviate this limitation, but then the printed indicia are no longer high in optical density and appear gray rather than black. Using a black dye that does not absorb too strongly in the UV region of the spectrum can result in darker black images that still exhibit UV fluorescence, but images printed with such dye black inks are generally poor in wet rub resistance. Increasing the concentration of the fluorescent pigment is not practical due to the high cost of these pigments and there are problems with being able to reliably jet inkjet inks that contain the overall high pigment content required to achieve both high black density and acceptable levels of fluorescence.

U.S. Pat. No. 6,793,723 (Auslander et al.) and U.S. Pat. No. 6,827,769 (Auslander et al.) each discloses aqueous inkjets ink capable of producing dark, machine-readable markings exhibiting fluorescence when exposed to UV radiation comprising: (a) a first colorant comprising a fluorescent dye such as a non-polymeric fluorescent dye that can be embedded within a polymeric matrix; (b) a second colorant comprising a mixture of visible dyes and/or pigments (such as blue with black dyes or pigment, or a blue dye or pigment with orange and red pigments to provide a relatively dense image); and (c) an aqueous liquid vehicle comprising water. The use of a black pigment, either as a single colorant as a mixture of other colorants, as the non-fluorescent colorant is not described or suggested in these patents. A resistance to smearing or removal in handling in either a wet or dry state is not described for these aqueous inkjet inks. Moreover, the use of mixtures of polymeric and/or non-polymeric fluorescent colorants and polymeric and/or non-polymeric non-fluorescent colorants adds unwanted cost and complexity to inkjet inks.

Despite the various efforts described in the art to provide non-smearing and highly dense images for security documents, there remains a need for water-based (aqueous) colored pigment-based inks that exhibit high optical density and resistance to smearing or removal from a non-fluorescing substrate. In addition, it is desired to provide highly dense images, especially highly dense black images, that produce a strong visible emission when illuminated with UV light. There is a further need for such aqueous colored pigment-based inks to be compatible with both DOD and CIJ inkjet printing systems.

SUMMARY OF THE INVENTION

To address the problems described above, the present invention provides a method of detecting a fluorescent image, comprising:

irradiating a colored latent fluorescent image disposed on a non-UV fluorescing substrate, the colored latent fluorescent image having an emission peak of at least 400 nm and up to and including 750 nm, on an outer surface of a non-UV fluorescing substrate, with fluorescence-exciting radiation having a peak of at least 200 nm and up to and including 400 nm, wherein the colored latent fluorescent image comprises:

a pigment colorant; and a non-polymeric fluorophore that when excited by fluorescence-exciting radiation having a peak of at least 200 nm and up to and including 400 nm, exhibits an emission peak of at least 400 nm and up to and including 750 nm, wherein the weight ratio of the pigment colorant to the non-polymeric fluorophore in the fluorescent image is from 70:1 to 0.5:1.

The present invention provides an aqueous colored pigment-based ink, and especially an aqueous black pigment-based ink, that can be used in either DOD or CIJ printing systems to provide colored latent fluorescent images (especially black latent fluorescent images). In addition, these colored latent fluorescent images are highly resistant to smearing or removal from a printed substrate under both wet and dry conditions. That is, the colored latent fluorescent images prepared using the present invention have high rub resistance in both wet and dry states. These aqueous colored pigment-based inks are designed to fluoresce in dry form because they include a suitable non-polymeric fluorophore that enables a viewer to see fluorescing security images or data upon appropriate excitation by specific radiation having a peak of at least 200 nm and up to and including 400 nm. These advantages are particularly evident when the aqueous color pigment-based inks are applied, for example using inkjet printing, onto non-UV fluorescing substrates and dried thereon (described below) to provide latent fluorescent images. These and various other advantages are described below in the details of this disclosure including the working examples that were carried out to demonstrate certain embodiments of the practice of the invention.

DETAILED DESCRIPTION OF THE INVENTION

Figure 1:
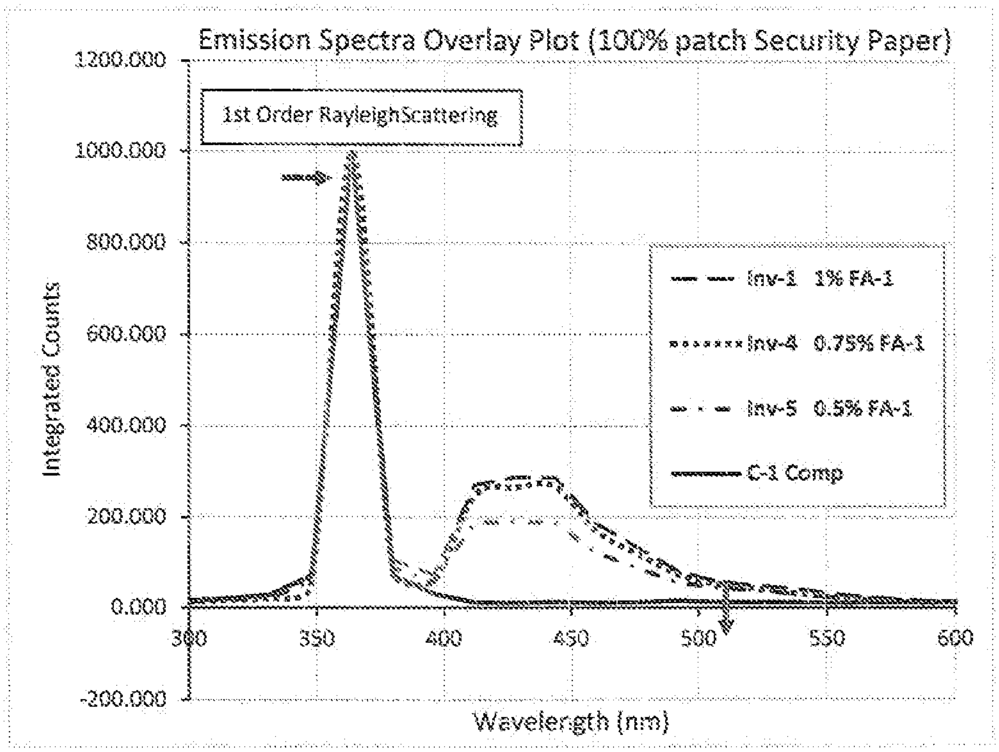
FIG. 1 is a graphical representation of spectral emission data obtained from black latent fluorescent images obtained in the working examples by printing specific inventive and comparative aqueous black pigment-based inks and irradiation with ultraviolet light.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described in the discussion of any specific embodiment.

Definitions

As used herein to define various components of the aqueous compositions for aqueous colored (including black colored) pigment-based inks, whether inventive or noninventive inks, and other materials used in the practice of this invention, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted to have a standard dictionary meaning.

The use of numerical values in the various ranges specified herein, unless otherwise expressly indicated otherwise, are to be considered as approximations as though the minimum and maximum values within the stated ranges were both preceded by the word "about." In this manner, slight variations above and below the stated ranges may be useful to achieve substantially the same results as the values within the ranges. In addition, unless otherwise indicated, the disclosure of these ranges is intended as a continuous range including every value between the minimum and maximum values as well as the end points of the ranges.

As used herein, the parameter "acid number" (also known as acid value) is defined as the milligrams (mg) of potassium hydroxide required to neutralize 1 g of the described acidic polymer.

The term "aqueous" in aqueous colored pigment dispersions and aqueous colored pigment-based inks that a capable of fluorescence according to the present invention means that the water content is greater than 70 weight %, or at least 80 weight % based on the total weight of all solvents. Water is the predominant solvent in each of such compositions.

The term "non-polymeric fluorophore" refers to a non-polymeric chemical compound that can absorb electromagnetic radiation ("light") of a specific wavelength and re-emit electromagnetic radiation ("light") at a longer wavelength. The non-polymeric fluorophores used in the present invention absorb UV radiation at wavelengths of generally between 200 nm and 400 nm and emit ("fluoresce") essentially visible radiation at wavelengths of generally between 400 nm and 750 nm. The fluorescence of an aqueous pigment-based ink according to the present invention or a printed colored latent fluorescent image obtained therefrom can be measured and characterized using, for example, a Perkin-Elmer LS-50B Fluorescence Spectrophotometer.

The term "colored latent fluorescent image" refers to an applied image of an aqueous colored pigment-based ink that is capable of fluorescence according to the present invention, which applied image is capable of exhibiting fluorescence at an emission peak of at least 400 nm and up to and including 750 nm when exposed to exciting radiation having a peak of at least 200 nm and up to and including 400 nm. As provided by the present invention, the colored latent fluorescent images are also by definition "colored" because of the presence of colored pigments in the applied aqueous colored pigment-based inks each of which is capable of fluorescence under the noted conditions.

In contrast, non-fluorescent aqueous pigment-based inks described herein and present in the inventive ink sets, are not capable of fluorescence to any appreciable or discernible extent in the noted conditions when exposed to exciting radiation.

The term "optical density" is a measure of the darkness of a printed colored image as measured by a densitometer; the decadic (base10) logarithm of the reciprocal of the transmittance is called the absorbance or optical density. For example, the optical density of a colored latent fluorescent image provided according to the present invention can be measured using a suitable commercial spectrophotometer, such as a Gretag Macbeth Spectrolino® spectrophotometer, and appropriate procedures.

CIELAB L*, a*, and b* values described herein have the known definitions according to CIE 1976 color space or later known standard versions of color space and were calculated using the power distribution function for a standard D65 illuminant and the 10° Standard Observer function. These calculated values can be used to express a color as three numerical color values: L* for the lightness (or brightness) of the color, a* for the green-red component of the color, and b* for the blue-yellow component of the color.

Median particle size ($d_{50}$ or $D_{50}$), in nanometers), can be determined using an appropriate particle measuring device and techniques, for example using a NANOTRAC®NPA 150 dynamic light scattering particle size analyzer (Microtrac, Inc.), which commercial analyzer provides a both an intensity weighted particle size distribution and a volume-weighted particle size distribution. Standard procedures for using such an analyzer are described in National Institute of Standards and Technology (NIST) Special Publication 1200-6, *Measuring the Size of Nanoparticles in Aqueous Media Using Batch-Mode Dynamic Light-Scattering NIST-NCL Joint Assay Protocol, PCC*-1 *Version* 1.2, May 2015 and in ISO 22412:2017 *Particle Size Analysis—Dynamic Light—Scattering* (*DLS*). Thus, $D_{50}$ or the $50^{th}$ percentile particle size (or median particle size) refers to the classified particle size distribution such that 50% of the particles have diameters smaller than the indicated diameter. The term $D_{95}$ (or $d_{95}$) or the $95^{th}$ percentile particle size refers to the classified particle size distribution such that 95% of the particles have diameters smaller than the indicated diameter.

Other particle size measuring techniques and equipment are known in the art also. For example, laser diffraction techniques will also provide a volume weighted particle size distribution. Dynamic light-scattering techniques will provide an intensity-weighted particle size distribution.

The term "water-soluble" when used in reference to aqueous solutions of solutes refers to a solubility in water of at least 0.1 g of solute in 100 ml of water (0.1 weight %) at 25° C.

The term "outer surface" in reference to the non-UV fluorescing substrate refers to a planar surface to which inkjet printing of any image is intended. It does not refer to an edge such as the edge of a sheet of paper, film, or paperboard.

Dynamic viscosity can be measured by any of well-known techniques. Preferred methods include measurement of the timing of mass flow through a capillary as in a capillary viscometer, or measurement of ball drop velocity through a fluid, using for example a rolling ball viscometer. Both a capillary flow viscometer and a commercially available Anton Paar Automated MicroViscometer (AMVn) employing the rolling ball technique can be used to measure the dynamic viscosities reported herein. All dynamic viscosity values disclosed herein were measured under gravity induced shear at approximately 24° C. to 26° C. It will be appreciated that the values cited are reported as centipoise (cP) or millipascal seconds (mPa-sec) and that 1 cP=$10^{-3}$ Pascal-seconds (Pa-sec) equals $10^{-2}$ dyne-sec/$cm^2$. While viscosities can be measured with high precision, viscosity values herein are reported to one or two decimal places only, and they are normally rounded values and not truncated values. All claims reciting dynamic viscosities are intended to be interpreted in terms of values in mPa-sec normally rounded to one decimal point.

For clarification of definitions for any terms relating to polymers, reference should be made to "Glossary of Basic Terms in Polymer Science" as published by the International Union of Pure and Applied Chemistry ("IUPAC"), *Pure Appl. Chem.* 68, 2287-2311 (1996). However, any definitions explicitly set forth herein should be regarded as controlling.

As used herein, the term "polymer" is used to describe compounds with relatively high molecular weights formed by linking together many small reactive monomers. As the polymer chain grows, it folds back on itself in a random fashion to form coiled structures. With the choice of solvents, a polymer can become insoluble as the chain length grows and become polymeric particles dispersed in the solvent medium.

The term "copolymer" refers to polymers composed of two or more different repeating or recurring units that are arranged along or pendant to the polymer backbone.

Recurring units in some of the polymers described herein are generally derived from the corresponding ethylenically unsaturated polymerizable monomers used in a polymerization process, which ethylenically unsaturated polymerizable monomers can be obtained from various commercial sources or prepared using known chemical synthetic methods.

Unless otherwise indicated, the term "weight %" refers to the amount of a component or material based on the total weight of an aqueous composition, aqueous formulation (such as an aqueous colored pigment-based ink), or dry layer (where it is essentially the same as % solids in that dry layer).

Percent (%) solids refers to the percentage by weight of non-volatile materials in a composition or solution (such as an aqueous colored pigment-based ink), which can be determined using known gravimetric procedures.

As used herein, the term "layer" or "coating" can consist of one disposed or applied layer or a combination of several sequentially disposed or applied layers, such as a combination of sub-layers.

Uses

The aqueous colored pigment-based inks prepared according to the present invention to be capable of fluorescence can be used particularly to provide colored latent fluorescent images having high optical density on various substrates and particularly on non-UV fluorescing substrates, which colored latent fluorescent images are resistant to smearing or removal in both a wet or dry state and can contain variable data that can be easily made to fluoresce upon suitable excitation, for example for authentication. Such colored latent fluorescent images are particularly useful when present on security documents (for example, ID's, driver's licenses, and passports), stock certificates, currency, lottery tickets, bank checks, product security tags or labels, and other articles wherein data or images are desired to provide authentication.

Aqueous Colored Pigment-Based Inks

An aqueous colored pigment-based ink that is capable of fluorescence according to the present invention can be prepared from a suitable aqueous dispersion of one or more particulate pigment colorants as a first essential component, that provide a desired color, using known dispersants and dispersing means. The aqueous colored pigment-based inks that are capable of fluorescence under the conditions noted above, according to the present invention can also be identified herein as an "aqueous fluorescent pigment-based inks" to distinguish them from aqueous non-fluorescent pigment-based inks that can also be used in various methods of the present invention, in combination with one or more aqueous fluorescent pigment-based inks.

A pigment colorant as part of an aqueous colored pigment-based dispersion can be mixed with one or more humectants (or co-solvents) and other optional components (described below) that can be formulated within an aqueous medium (predominantly water) to provide an aqueous colored pigment-based ink having a viscosity at 25° C. of at least 1 centipoise (1 mPa-sec) or at least 2 centipoise (2 mPa-sec) and up to and including 10 centipoise (10 mPa-sec) or up to and including 50 centipoise (50 mPa-sec), all measured at 25° C. using a rolling ball viscometer, or as described above.

Each aqueous colored pigment-based ink that is capable of fluorescence according to the present invention generally can have a solids content of at least 1% solids and up to and including 10% solids or up to and including 20% solids, and the remaining weight of the aqueous colored pigment-based ink is an aqueous medium that can comprise at least 80 weight %, at least 85 weight %, or at least 90 weight %, water, based on the total aqueous medium, including liquid humectants or co-solvents.

Thus, each aqueous colored pigment-based ink according to the present invention typically comprises one or more particulate organic or inorganic pigment colorants that will provide the desired color or hue. For example, black pigments are particularly useful and can be present individually or in combinations to provide a very dense black color in the resulting black latent fluorescent images. In addition, one or more black pigments such as one or more carbon black pigments can be combined with one or more differently colored pigments such as a cyan copper phthalocyanine or a magenta quinacridone pigment as long as the desired black appearance and optical density are obtained in the resulting black latent fluorescent image.

In general, the pigment colorants used in the practice of this invention are non-UV fluorescing, meaning that they do not fluoresce when irradiated at a wavelength of at least 200 nm and up to and including 400 nm to any appreciable extent.

Non-fluorescing black pigments are particularly useful in many embodiments of aqueous colored pigment-based inks in the practice of this invention. Although any black pigment can be used to produce aqueous black pigment-based inks of the present invention that provide colored latent fluorescent images that exhibit high optical density and resistance to smearing or removal from a non-fluorescing substrate, the various commercially-available carbon blacks are particularly useful. Representative suitable carbon black pigments include but are not limited to, NIPex® 160 IQ, NIPex® 170 IQ, NIPex® 180 IQ, Colour Black FW 2, Colour Black FW 200, Colour Black FW 285, Colour Black FW 1, Colour Black FW 18, Colour Black FW, and Colour Black FW 18, and Printex® 95 pigments, all produced by Orion Engineered Carbons; Black Pearls® 1100, Black Pearls® 900, Black Pearls® 880, Black Pearls® 600, Monarch® 1100, and Monarch® 900 pigments produced by Cabot Corp; and any of the Raven black pigments produced by Birla Specialty Carbons. Other black pigments are also acceptable and may be comprised of inorganic particles such as magnetite, ferrite, titanium black, or combinations thereof.

Colored, non-black pigment colorants can be combined in suitable proportions to provide a visibly appearing black image of varying densities. One skilled in the art would know how to choose the desired colored, non-black pigment colorants at desired proportions, in combination with the necessary non-polymeric fluorophore described below, to achieve this purpose.

Other useful organic or inorganic pigment colorants can be used to provide any desired non-black color or hue in a resulting non-black (but colored) latent fluorescent image, such as fluorescent green, red, yellow, blue, violet, magenta, cyan, white, brown, pink, and grey images, as well as any other non-black hues known in the art. Pigment colorants can be present individually or in mixtures in each aqueous colored non-black pigment-based ink. For example, aqueous colored non-black pigment-based inks useful in the present invention can comprise one or more pigment colorants including but not limited to, cyan pigments, magenta pigments, yellow pigments, green pigments, orange pigments, white pigments, red pigments, blue pigments, violet pigments, or a combination of any of these pigment colorants, It is particularly desirable that any or all of the pigment colorants used in the practice of this invention are anionically-stabilized as described below for the black pigments.

Representative examples of useful colored pigments are described for example, in U.S. Pat. No. 5,026,427 (Mitchell et al.), U.S. Pat. No. 5,141,556 (Matrick), U.S. Pat. No. 5,160,370 (Suga et al.), and U.S. Pat. No. 5,169,436 (Matrick), the disclosures of all of which are incorporated herein by reference with respect to those materials. In general, useful pigment colorants include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, and titanium dioxide. Useful pigment colorants are also described in Col. 10 (lines 66) to Col. 11 (line 40) of U.S. Pat. No. 8,455,570 (Lindstrom et al.), the disclosure of which is incorporated herein by reference. Mixtures of pigments can be used to provide a desired hue or color, as described for example in U.S. Pat. No. 9,605,169 (Lussier et al.), the disclosure of which is incorporated herein by reference.

The aqueous colored pigment-based inks and particularly the aqueous black pigment-based inks according to this invention are capable of providing colored latent fluorescent images with high optical density upon application (such as by inkjet printing) to a suitable non-UV fluorescing substrate (as described below). This is especially true when a black latent fluorescent image is desired using an aqueous black pigment-based ink for example, containing a carbon black.

The visible density or darkness of an inkjet-printed colored latent fluorescent image can be defined at least in part by the following parameter: when the aqueous colored pigment-based ink that is an aqueous black pigment-based ink is present in dry form as a colored latent fluorescent image on a non-UV fluorescing substrate (defined below), the unprinted area exhibits a L* value of 50 or higher, as measured under illumination that does not contain UV light of wavelengths less than 400 nm (or excludes fluorescence-exciting wavelengths), as well as an a* value of −20 to and including +20 and a CIE b* value of at least −15 to and including +20.

Useful pigment colorants of all types can be accompanied by suitable polymeric or non-polymeric dispersants that are well known in the art (for example, dispersants having anionic groups as described below), or the pigment colorants can be self-dispersing, for example, as having anionically-charged groups attached to the pigment particle surface, and thus be dispersible and stable in a pigment colorant dispersion as well as the resulting aqueous colored pigment-based ink. Examples of useful self-dispersing black pigment colorants are described in Col. 11 (lines 49-53) of U.S. Pat. No. 8,455,570 (noted above). Discussions of self-dispersing and use of dispersants for pigment particles are provided in [0057] to [0067] of U.S. Patent Application Publication 2014/0231674 (noted above), the disclosure of which is incorporated herein by reference, even though those discussions are directed to non-polymeric fluorescent pigment particles. The principle is useful also for black pigments and other pigment colorants.

Thus, it is particularly useful that the pigment colorants used in the present invention to provide colored latent fluorescent images of any desired hue, and especially the pigment colorants used to provide black latent fluorescent images, be stabilized with anionic moieties (that is, they are "anionically-stabilized pigment colorants"). Such anionically-stabilized pigment colorants including anionically-stabilized black pigments, can be purchased from various commercial sources, and a skilled worker would know which pigment colorants could be used in the present invention for a particular aqueous color pigment-based ink and inkjet printing method.

Useful pigment colorants can have a median particle diameter of at least 10 nm and generally less than 200 nm, and preferably less than 100 nm or even less than 50 nm. As noted above, the term "median particle diameter" refers to the $D_{50}$ of the classified particle size distribution such that 50% of the volume of the pigment colorant particles is provided by pigment particles having diameters smaller than the indicated diameter.

Organic or inorganic pigment colorants (or a combination of pigment colorants), especially those that are anionically-stabilized black pigments, can be formulated as an essential component with other components described in an aqueous colored pigment-based ink in an amount of at least 1 weight % or of at least 3 weight %, or of at least 4 weight %, and up to and including 6 weight %, or up to and including 7 weight %, based on the total weight of the aqueous colored pigment-based ink.

A second essential component of the aqueous colored pigment-based inks according to this invention is a non-polymeric fluorophore, or a mixture of such compounds. By "non-polymeric," it is meant that each of these fluorophore compounds has a molecular weight of less than about 1000 Daltons and do not contain regular repeating units as typically polymeric materials do. Moreover, these non-polymeric fluorophores are typically "water-soluble" as that term is defined above. Thus, such compounds are generally non-particulate when present within the aqueous colored pigment-based inks according to the present invention.

Each of the non-polymeric fluorophores is chosen so that it can be excited by fluorescence-exciting radiation in the UV region of the electromagnetic spectrum, that is exciting radiation having a peak ($\lambda_{max}$) of at least 200 nm and up to and including 400 nm. In addition, each of these non-polymeric fluorophores, upon this excitation, can exhibit a visible radiation emission peak of at least 400 nm and up to and including 750 nm, more preferably of between 400 nm and 500 nm (or typically an emission within the "blue" region of the electromagnetic spectrum).

Moreover, each non-polymeric fluorophore used in the practice of this invention is typically "colorless", meaning that under normal viewing conditions, it is invisible to the typical unaided human eye or does not exhibit a noticeable coloration or hue to the typical unaided human eye.

Classes of useful non-polymeric fluorophores are described, for example, in the "Colour Index™ that is maintained by the Society of Dyers and Colourists & American Association of Textile Chemists and Colourists" and that is published solely now on the World Wide Web and is referenced in the Wikipedia article "Welcome to Colour Index" that is periodically updated. Useful non-polymeric fluorophores may be labeled "optical brighteners", "fluorescent brightening agents", or "whiteners" and a skilled worker would be able to use the teaching provided herein and routine experimentation to determine if a particular compound is useful in the present invention. The water-solubility feature mentioned above is quite important and if a particular compound that can be made to fluoresce at the desired visible wavelengths after appropriate excitation, but it has unacceptable water-solubility, it is generally not useful in the practice of the present invention.

Some particularly useful non-polymeric fluorophores are compounds having multiple sulfonate groups, or other groups (such as carboxylates and polyethylene oxide groups) that provide water solubility of the compounds. Representative compounds of this type include diamino stilbenes having multiple sulfonate groups.

For example, using the teaching provided herein, a skilled worker would be able to determine a useful non-polymeric fluorophore (or mixture thereof) from the commercially available compounds as well as the literature describing fluorescent materials, using routine experimentation to see if the resulting inkjet-printed colored latent fluorescent image has the necessary readily detectable fluorescent emission after the required UV (200-400 nm) excitation.

The total amount of one or more non-polymeric fluorophores present in the aqueous colored pigment-based inks (and particular in the aqueous black pigment-based inks) according to the present invention can be at least 0.1 weight % or at least 0.2 weight %, and up to and including 1 weight % or up to and including 2 weight %, all based on the total weight of the aqueous colored pigment-based ink.

Each aqueous colored pigment-based ink according to the present invention generally comprises one or more humectants (or sometimes identified as co-solvents) as optional but desirable components. The term "humectant" is generally a water-miscible co-solvent that slows down the rate of evaporation of an aqueous pigment-based ink, thereby delaying precipitation of the solid components of the ink. As such, a humectant has a higher boiling point, and a lower vapor pressure at a given temperature, than water such that it is more difficult to evaporate than water. Thus, humectants are water miscible polar organic compounds (typically a low volatility solvent having a boiling point at sea level near or greater than about 200° C.), or a combination of such compounds, that retards water evaporation from an aqueous-based ink to reduce printhead jetting failures due to blocked nozzles or crooked jets resulting from the formation of dried ink deposits. Any water-soluble or water-miscible humectant known in the inkjet ink art that is compatible with the other requirements of the invention can be used in the practice of the present invention. While an individual humectant can be employed, mixtures of two or more humectants, each of which imparts a useful property, can be used. Representative humectants are described for example, in [0074] to [0080] of U.S. Patent Application Publication 2014/0231674 (noted above), and in U.S. Pat. No. 9,828,513 (Lussier et al.), the disclosures of both of which are incorporated herein by reference.

Particularly useful humectants include glycerol, or a compound, each of which independently has a carbon atom to oxygen atom ratio of at least 1.0:1.0 or at least 1.3:1.0 and up to and including 2.7:1.0. These humectants do not contain heteroatoms, such as nitrogen or sulfur, but contain only carbon, hydrogen, and oxygen atoms. More specifically, each of such water-soluble or water-miscible humectants has only two hydroxy oxygens (for example, in two hydroxy groups). Some of these useful water-miscible humectants can have one or more oxy or ether bond oxygens. For example, useful humectants include but are not limited to, 2-(2-hydroxyethoxy)ethanol and 2-[2-(2-hydroxyethoxy) ethoxy]ethanol ("TEG"); dihydroxyethane (or 1,2-ethanediol); dihydroxypropanes, such as 1,2-dihydroxypropane (or 1,2-propanediol) and 1,3-dihydroxypropane (or 1,3-propanediol); dihydroxybutanes, such as 1,2-dihydroxybutane (or 1,2-butanediol), 1,3-dihydroxybutane (or 1,3-butanediol), 2,3-dihydroxybutane (or 2,3-butanediol), 1,4-dihydroxybutane (or 1,4-butanediol), 1,3-dihydroxy-2-methylpropane, and 1-hydroxy-2-hydroxy-2-methylpropane; and dihydroxypentanes, such as 1,2-dyhydroxy-n-pentane (or 1,2-n-pentanediol), 1,5-dihydroxy-n-pentane (or 1,5-n-pentanediol).

In addition, a humectant can be 1,2-ethanediol, 1,2-propanediol, 1,3-propanediol, 1,2-butanediol, 2,3-butanediol, 1,3-butanediol, 1,2-pentanediol, 2,3-pentandiol, 1,3-pentanediol, 2-(2-hydroxyethoxy)ethanol, 2-(2-hydroxyethoxy)ethanol, 2-[2-(2-hydroxyethoxy)ethoxy] ethanol, or a combination of two or more of these compounds.

The one or more humectants can be present in an aqueous colored pigment-based ink (and especially in an aqueous black pigment-based ink) according to the present invention an amount of at least 0.5 weight %, or of at least 1 weight %, or of at least 3 weight %, and up to and including 7 weight %, or up to and including 10 weight %, or up to and including 15 weight %, all based on the total weight of the aqueous colored pigment-based ink, especially if CU printing (described below) is intended. However, for aqueous colored pigment-based inks designed for piezo DOD printing, the one or more humectants can be present in an amount of at least 10 weight % up to and including 50 weight %.

Each aqueous colored pigment-based ink useful according to the present invention can also comprise one or more anionically-charged polymeric compounds, as another optional component. Each of these anionically-charged polymeric components generally has an acid number of at least 50 or of at least 60, and up to and including 90 or up to and including 150. Such anionically-charged polymeric materials are described in more detail below.

For example, useful anionically-charged polymeric components of this type include but are not limited to, anionic polyurethanes that are described in numerous patent publications described below.

Alternatively or in addition to the anionic polyurethanes, the aqueous colored pigment-based ink can comprise one or more anionically-charged copolymers such as styrene-(meth)acrylic copolymers, each having an acid number of at least 50 or of at least 120 and up to and including 220 or up to and including 240, and which anionically-charged polymeric components are described in more detail below and in the cited patent literature. The term "(meth)acrylic" refers to materials derived at least in part from either or both of acrylic acid and methacrylic acid.

Representative examples of both types of the described anionically-charged polymers are described for example in U.S. Patent Application Publication 2014/0231674 (noted above) and U.S. Pat. No. 8,430,492 (Falkner et al.) and 9,783,553 (noted above), the disclosures of all of which are incorporated herein by reference. Particularly useful anionically-charged polyurethanes contain a polyether diol unit and can be identified as polyether polyurethanes and generally have a molecular weight (Mw) of at least 10,000 Daltons and up to and including 30,000 Daltons. Some particularly useful polyether polyurethanes are individually represented by Structure (I) in U.S. Pat. No. 9,783,553 (noted above). Useful water-soluble or water-dispersible anionically-charged polyether polyurethanes can be prepared as described for example in [0045]-[0049] of U.S. Pat. No. 8,430,492 (noted above), the disclosure of which is incorporated herein by reference. The acidic groups in the anionically-charged polyether polyurethanes can be at least partially and up to 100% neutralized (converted into salts) using monovalent inorganic bases such as alkaline metal hydroxides or organic amines such as dimethylethanolamine.

Representative anionically-charged (meth)acrylic polymers and anionic styrene-(meth)acrylic polymers useful in the present invention are described for example in [0061] of U.S. Patent Application Publication 2008/207811 (noted above). Examples of useful anionically-charged styrene-acrylic polymers include those commercially available under the trademarks JONCRYL® (S.C. Johnson Co.), TRUDOT® (Mead Westvaco Co.), and VANCRYL® (Air Products and Chemicals, Co.).

In addition, modified polysiloxanes can be present in the aqueous colored pigment-based ink(s) as other optional components. Examples of such materials are ethoxylated or propoxylated silicone-based "surfactants" that can be obtained commercially under the trademarks SILWET® (CL Witco), and BYK® (Byk Chemie) such as BYK® 348 and 381, as well as Dow Corning DC67, DC57, DC28, DC500W, and DC51. Non-silicone surfactants can also be used, including but not limited to anionic, cationic, nonionic, or amphoteric surfactants such as those commercially available as SURFYNOL® surfactants (Evonik) including SURFYNOL® 440 and 465 alkynediol surfactants.

Some embodiments of the aqueous black pigment-based inks of the present invention further contain one or more water-soluble black dyes for the purpose of enhancing the black density of the formed black latent fluorescent images as long as they do not adversely impact the wet rub resistance of the black latent fluorescent images. Useful water-soluble black dyes are known in the art and are available from various commercial sources. For example, useful water-soluble black dyes include but are not limited to, Food Black 1, Food Black 2, Food Black 40, Carta Black, various Direct Black dyes (for example, 4, 14, 17, 22, 27, 38, 51, 112, 117, 154, and 168), carboxylated Food Black 286, and Acid Black dyes (for example, 1, 7, 9, 24, 26, 48, 52, 58, 60, 61, 63, 92, 107, 109, 118, 119, 131, 140, 155, 156, 172, and 194). One or more of such water-soluble black dyes can be present in the aqueous black pigment-based inks in a total amount (all black dyes present) of at least 0.1 weight % and up to and including 2 weight %, based on the total weight of the aqueous black pigment-based ink according to the present invention.

Other optional additives that can be present in the aqueous colored pigment-based inks, in amounts that would be readily apparent to one skilled in the art, including but are not limited to, thickeners, surfactants, dispersing agents, drying agents, waterfast agents, viscosity modifiers, pH buffers, preservatives, antifoamants, wetting agents, corrosion inhibitors, biocides, fungicides, defoamers (such as SURFYNOL® DF110L, PC, MD-20, and DF-70, Evonik Industries), antioxidants, and light stabilizers available under the trademarks TINUVIN® (Ciba) and IRGANOX® (Ciba), as well as other additives described in Col. 17 (lines 11-36) of U.S. Pat. No. 8,455,570 (noted above) as being useful in aqueous pigment-based inks.

In particular, besides those compounds described above, other optional additives that can be present in an aqueous colored pigment-based ink (such as an aqueous black pigment-based ink) of the present invention include one or more of a biocide, defoamer, dispersing agent, and an anionically-charged polymeric component having an acid value of at least 50, as described above.

The pH of each aqueous colored pigment-based ink according to this invention can be adjusted if desired to at least 8 and up to and including 12, or more likely to at least 8 and up to and including 10, or in some embodiments to at least 8 and up to and including 9.5. The pH can be achieved using any suitable base such as a hydroxide or an organic amine in a suitable amount. Buffers can be included to maintain the desired pH as would be readily apparent to one skilled in the art, according to Cols. 17-19 of U.S. Pat. No. 8,455,570 (noted above).

Method and Apparatus for Forming Fluorescent Colored Images

Suitable substrates and especially those having appropriate properties for use in, for example, security documents, currency, and lottery tickets, according to the present invention can be provided with a colored latent fluorescent image that may be black in color or have a color other than black, for example, using inkjet printing, by suitable application of one or more aqueous colored pigment-based inks that are capable of fluorescence according to the present invention. An aqueous colored pigment-based ink can be applied (for example, inkjet-printed) to form a colored latent fluorescent image on an outer surface of a treated or untreated non-UV fluorescent substrate prepared from any of a variety of materials, as described in more detail below. The colored latent fluorescent image can be provided according to the present invention directly on an outer surface of the substrate, or it can be applied in a suitable manner over a differently-colored non-UV fluorescing image that has been previously applied to the substrate outer surface as described in more detail below. For example, a black latent fluorescent image can be formed over a non-fluorescent image having any color, such as a non-black monochrome or multicolored image.

Application of the aqueous colored pigment-based ink that is capable of fluorescence according to the present invention can be achieved by a number of means, including but not limited to, inkjet printing, including continuous inkjet printing, thermal drop-on-demand inkjet printing, and piezoelectric drop-on-demand inkjet printing, or any other type of printing that can utilize aqueous pigmented inks, for example, flexographic printing, gravure printing, letterpress printing, screen printing, and other techniques known in the art.

In most embodiments of the present invention, a colored latent fluorescent image (such as a black latent fluorescent image) can be provided on a suitable non-UV fluorescing substrate by inkjet printing one or more aqueous colored pigment-based inks according to the present invention.

In the following discussion, consistent with the teaching provided above, the disclosure is directed to the predominant means of forming a colored latent fluorescent image of any desired color or multiple colors, by inkjet printing one or more aqueous colored pigment-based inks according to the present invention. However, it is to be understood that this discussion is also relevant to use of the more desirable inkjet printing to form black latent fluorescent images using an aqueous black pigment-based ink according to the present invention.

For example, an aqueous colored pigment-based ink according to this invention can be used in drop-on-demand (identified herein as "DOD") printing systems of any configuration or mechanical system, that are commonly sold in the consumer market for home or office use, or for industrial uses such as imprinting onto various articles. However, advantages of the present invention are particularly evident when the method according to the present invention is carried out using continuous inkjet (CIJ) printing processes and equipment at high printing speeds on non-UV fluorescing substrates such as non-UV fluorescing papers, non-UV fluorescing polymeric films, and non-UV fluorescing paperboard. Such CIJ printing processes and equipment can include the use of high-speed inkjet printers such as those commercially available from Eastman Kodak Company under the brand(s) KODAK PROSPER S-Series and KODAK PROSPER Plus Imprinting Systems.

There are several CIJ printing processes and apparatus known in the art, and the present invention is not limited to a particular CIJ process and apparatus, but there may be certain CIJ processes and apparatus that are more useful than others such as the Eastman Kodak Company systems and processes referenced above. In general, such CIJ processes can utilize an aqueous colored pigment-based ink according to the present invention alone to provide a colored latent fluorescent image, or it can provide a combination of images, some colored latent fluorescent and others being colored and non-fluorescent, using a combination of aqueous colored pigment-based inks, each of which is ejected through one or more printheads (containing nozzles) from one or more ink reservoirs, and unprinted fluorescent and non-fluorescent aqueous colored pigment-based inks are collected and recycled through the printing system multiple times until each ink is used up. In addition, useful CIJ printing systems can have incorporated replenisher systems for one or more aqueous colored pigment-based inks. For example, details of useful CIJ processes and equipment are provided for example in U.S. Pat. No. 8,173,215 (Sowinski et al.), the disclosure of which is incorporated herein by reference in its entirety.

For example, an aqueous colored pigment-based ink that is capable of fluorescence can be applied to (inkjet-printed onto) the outer surface of a non-UV fluorescing substrate using continuous inkjet printing wherein the aqueous colored pigment-based ink is provided from a main fluid supply that can both supply the aqueous colored pigment-based ink and receive returned non-printed aqueous colored pigment-based ink.

In one useful CIJ inkjet printing process, each aqueous colored pigment-based ink, such as an aqueous black pigment-based ink, of the present invention, can be ejected or printed from a main fluid supply dedicated to it only, as a continuous stream of each aqueous colored pigment-based ink can be broken into both printing drops and non-printing drops. The non-printing drops of each aqueous colored pigment-based ink can be collected using suitable collecting means such as a "catcher" and returned to its respective main fluid supply. This entire inkjet printing scenario can be carried out by inkjet printing an aqueous black pigment-based ink alone, or inkjet printing multiple aqueous colored pigment-based inks, all of which can provide colored latent fluorescent images. In other scenarios, one or more colored latent fluorescent images can be provided with one or more non-fluorescent colored or colorless images using one or more non-fluorescing aqueous colored or colorless pigment-based inks, respectively. The one or more aqueous colored pigment-based inks of all types are inkjet printed in a chosen sequence that can be controlled by software and digital input, in a controlled manner, to provide a latent fluorescent monochrome or a latent fluorescent polychrome image on an outer surface of the non-UV fluorescing substrate.

In a particularly useful embodiment, an aqueous colored pigment-based ink can be supplied from a suitable main fluid supply as a continuous stream, and this continuous stream can be broken into both printing drops and non-printing drops that are collected and returned from the continuous stream to the main fluid supply for future use. This main fluid supply of aqueous colored pigment-based ink can be replenished with additional ink or with replenishing fluid that is primarily water so ink viscosity is maintained. For example, the method of this invention can include continuously recirculating unused aqueous colored pigment-based ink to the inkjet printer.

After application of the aqueous colored pigment-based ink that is capable of fluorescence onto a suitable non-UV fluorescing substrate outer surface to provide a colored latent fluorescent image, a colorless aqueous composition or fluid can be applied over the colored latent fluorescent image, for example using inkjet printing. For example, according to U.S. Patent Application Publication 2018/0051184 (Lussier et al.), the disclosure of which is incorporated herein by reference in its entirely, a colorless lacquer or colorless aqueous composition can be applied over a colored latent fluorescent image of any color, over a black latent fluorescent image, or over a multicolored latent fluorescent image. It is important, however, that such a colorless aqueous composition or fluid does not absorb a significant amount of light at the excitation wavelength of the non-polymeric fluorophore after its application to the colored latent fluorescent image, or when the colored latent fluorescent image is "excited" to reveal fluorescent text or images that are to be observed. In addition, the applied colorless aqueous composition should also not absorb a significant amount at the emission wavelength after excitation of the colored latent fluorescent image. By "significant", it is meant that such excitation absorption or emission absorption is no more than 5% of the excitation absorption or emission absorption that would occur if the colorless aqueous composition is not present.

Printer replenishment systems for maintaining quality of the aqueous colored pigment-based ink and to counter the effects of volatile component evaporation, and which measure ink electrical resistivity can also be used in the practice of this invention. Such systems are described for example in U.S. Pat. No. 5,526,026 (Bowers), the disclosure of which is incorporated herein by reference in its entirely, as well as in EP 0597628B1 (Loyd et al.). Useful CIJ printing processes and equipment that employ other means for aqueous colored pigment-based ink concentration sensing are disclosed in U.S. Pat. No. 7,221,440 (McCann et al.), the disclosure of which is incorporated herein by reference, and also in EP 0 571,784B1 (McCann et al.) and EP 1,013,450B1 (Woolard et al.).

In some embodiments, basic replenishment of the aqueous colored pigment-based ink can be carried out as using a fluid system containing an ink resistivity measurement cell through which the aqueous colored pigment-based ink passes as it is being recirculated through the ink handling portion of the system, including the printhead. A calculation means determines the resistance of the ink resistivity cell. A logic and control unit, responsive to the calculation means, controls the transfer of aqueous colored pigment-based ink from a supplemental "ink" supply and the transfer of an aqueous particle-free fluid ("carrier fluid") from a replenishment carrier fluid supply to the system main fluid supply, to maintain desired resistivity in the aqueous colored inkjet ink composition. The volume of the aqueous colored pigment-based ink can be monitored by a float valve position, and when a predetermined volume has been depleted, the predetermined volume is replaced by either aqueous colored pigment-based ink from the supplemental "ink" supply or a carrier fluid from the replenishment carrier fluid supply.

In other examples, the method according to the present invention can further comprise replenishing a main fluid supply of the aqueous colored pigment-based ink with an aqueous particle-free fluid that has a dynamic viscosity of less than or equal to 5 centipoise (5 mPa-sec) as measured at 25° C. using a rolling ball viscometer.

More details about useful CIJ printing systems and equipment are provided for example in U.S. Pat. No. 6,943,037 (Anagnostopoulos et al.), U.S. Pat. No. 6,588,888 (Jeanmaire et al.), U.S. Pat. No. 6,554,410 (Jeanmaire et al.), U.S. Pat. No. 6,682,182 (Jeanmaire et al.), U.S. Pat. No. 6,793,328 (Jeanmaire et al.), U.S. Pat. No. 6,866,370 (Jeanmaire et al.), U.S. Pat. No. 6,575,566 (Jeanmaire et al.), and U.S. Pat. No. 6,517,197 (Hawkins et al.), and in U.S. Patent Application Publication 2002/0202054 (Jeanmaire et al.), the disclosures of all of which are incorporated herein by reference in their entireties.

Thus, printing the aqueous colored pigment-based ink onto anon-UV fluorescing substrate outer surface can be achieved to form a colored latent fluorescent pattern (or image), and this can be accomplished in a manner to provide a colored latent fluorescent image in registration with the pattern of other printed (non-fluorescent) colors using non-fluorescing aqueous colored pigment-based inks (described below) using a suitable inkjet deposition system.

As noted above, the aqueous colored pigment-based ink according to the present invention can be used in inkjet printing methods in combination with application or inkjet printing of non-fluorescing aqueous colored pigment-based or non-fluorescent-colored dye-based inks. Various non-fluorescing aqueous colored pigment-based or dye-based inks are known in the art and they can be adapted to a method in which both one or more of them and the aqueous colored pigment-based ink of the present invention are used in combination in the same or different inkjet printing apparatus.

In some embodiments, the aqueous colored pigment-based ink that is capable of fluorescence is an aqueous black pigment-based ink, and the colored latent fluorescent image is a black latent fluorescent image. As used herein, the term "colored latent fluorescent image" refers to an image that visually appears colored in the absence of the fluorescence-exciting radiation.

Non-fluorescing aqueous colored pigment-based inks can be prepared from suitable aqueous dispersions of one or more colored particulate pigments using known dispersants and dispersing means (for example, as described above). The resulting aqueous colored pigment-based dispersions can be mixed with one or more humectants (as described above) and the components can be formulated in an aqueous medium (predominantly water) to provide non-fluorescing aqueous colored pigment-based inks, each having a dynamic viscosity of less than or equal to 10 centipoise (10 mPa-sec), or less than or equal to 5 centipoise (3 mPa-sec), or even less than or equal to 3 centipoise (1.5 mPa-sec), all measured at 25° C. as described above using a rolling ball viscometer.

Useful non-fluorescing aqueous colored pigment-based inks can also include one or more polymeric or non-polymeric dispersants that are well known in the art (as described above), or the pigments can be self-dispersing and thus dispersible.

Such non-fluorescing aqueous colored pigment-based inks can include the pigment colorants described above, as well as the various humectants, anionically-charged polymers, and other addenda described above. The amounts of the various components would be readily apparent to one skilled in the art from the considerable published literature including that mentioned above.

Water is generally present in each non-fluorescing aqueous colored pigment-based ink in an amount of at least 75 weight % or at least 80 weight %, and generally at no more than 90 weight %, based on the total weight of the aqueous colored pigment-based ink.

Moreover, the pH of each non-fluorescing aqueous colored pigment-based ink can be adjusted if desired to at least 8 and up to and including 12, or more likely to at least 8 and up to and including 10, or in some embodiments to at least 8 and up to and including 9.5, using known chemicals and procedures.

A skilled worker could use routine experimentation to determine the best time to inkjet print one or more non-fluorescing aqueous colored or colorless pigment-based inks in relation to inkjet printing the aqueous colored pigment-based ink according to the present invention. Thus, inkjet printing of the aqueous colored pigment-based ink of the present invention can be carried out prior to, simultaneously with, or subsequently to, inkjet printing of one or more non-fluorescing aqueous colored pigment-based inks outside of the present invention, as long at the advantages of the present invention as described above are not significantly diminished.

Inkjet Printed Articles

The substrates onto which the aqueous colored pigment-based inks that a capable of fluorescence are applied such as by inkjet printing, in order to obtain the best colored latent fluorescent image density and reduced smearing, are those that are considered "non-UV fluorescing" substrates meaning that when excited by fluorescence-exciting radiation having a peak of at least 200 nm and up to and including 400 nm, the substrates do not exhibit an emission peak of at least 400 nm and up to and including 750 nm, to any detectable extent. This is so that the colored latent fluorescent images printed using the present invention will stand out in contrast to the unprinted non-UV-fluorescing substrate outer surface.

In addition, it is particularly useful in order to obtain the ultimate advantages of the present invention that such non-UV fluorescing substrates generally have a limited porosity so that the applied aqueous colored pigment-based ink is not substantially absorbed into the interior of the non-UV fluorescing substrate before the applied aqueous colored pigment-based ink dries. In addition to the porosity of the substrate, the physical properties of the ink, such as viscosity, surface tension, and pigment particle size, can determine the degree of penetration of the aqueous colored pigment-based ink into the interior of a porous non-UV fluorescing substrate. Rather, a skilled worker in the art would be able to use the teaching provided herein and test various aqueous colored pigment-based inks to see which would provide the desired colored latent fluorescent images against the outer surface of the non-UV-fluorescing substrate before drying. In some applications of the invention, a fainter colored latent fluorescent image may be suitable whereas in other applications of the invention, a more visible (denser) colored latent fluorescent image may be required, and the non-UV fluorescing substrate would need to have very little surface porosity, such as from resin coatings or other water-repellant coatings known in the paper industry.

In general, useful non-UV fluorescing substrate materials having these properties can be paper-like and composed of a cellulosic material that are surface coated with resin or clay-based treatments to reduce surface porosity. Supercalendering is another method that can be used to reduce the surface porosity of a paper-based substrate. However, it is generally desirable that the non-UV fluorescent substrates have matte surfaces and are not typically shiny or glossy substrates. Such useful non-UV fluorescing substrates can be obtained from a variety of commercial sources including but not limited to, International Paper, Sappi, NewPage, Appleton Coated, Abitibi-Bowater, Mohawk Papers, Verso, Mitsubishi, Norpac, and Domtar. Non-paper-based or so-called synthetic paper-based substrates can also be used as long as they are non-UV fluorescing as defined above.

Moreover, the non-UV fluorescing substrates used in the practice of this invention can have an opacity of at least 30% or of at least 50%, as determined using the standard TAPPI 425 OP-16 opacity test and can have a colorimetry defined by an a* value of at least −5 and to and including +5 and a b* value independently of at least −5 and to and including +5, or more likely each of the a* and b* values are independently at least −3 and up to and including +3.

On the other in hand, in certain embodiments, transparent or translucent film-based substrates can also be used in combination with the aqueous colored pigment-based inks of the present invention as long as the films are non-UV fluorescing as defined above.

Thus, articles prepared according to the present invention comprise a non-UV fluorescing substrate (as described above) on which an aqueous colored pigment-based ink that is capable of fluorescence (such as an aqueous black pigment-based ink that is capable of fluorescence) has been disposed for example by inkjet-printing (as described above) to provide a colored latent fluorescent image such as a black latent fluorescent image. Non-fluorescent colored or non-fluorescent colorless images also can be present on the same non-UV fluorescing substrate, as described above.

In each colored latent fluorescent image provided on such articles, the one or more pigment colorants (such as one or more black pigments) as described above can be present in an amount of at least 10 weight % or of at least weight %, and up to and including 60 weight % or up to and including 80 weight %, based on the total weight of the colored latent fluorescent image.

Moreover, one or more non-polymeric fluorophores as described above can be present in each colored latent fluorescent image in an amount of at least 1 weight % or at least 5 weight %, and up to and including 10 weight % or up to and including 20 weight %, based on the total weight of the colored latent fluorescent image.

More particularly, the non-polymeric fluorophore and the total of pigment colorants can be present in the colored latent fluorescent images in a weight ratio of the total of pigment colorants to the total of the non-polymeric fluorophores of 70:1 to 0.5:1, or more likely in a weight ratio of 50:1 to 1:1.

The present invention provides at least the following embodiments and combinations thereof, but other combinations of features are considered to be within the present invention as a skilled artisan would appreciate from the teaching of this disclosure:

1. A method of detecting a fluorescent image, comprising:

irradiating a colored latent fluorescent image disposed on a non-UV fluorescing substrate, the colored latent fluorescent image having an emission peak of at least 400 nm and up to and including 750 nm, on an outer surface of a non-UV fluorescing substrate, with fluorescence-exciting radiation having a peak of at least 200 nm and up to and including 400 nm, wherein the colored latent fluorescent image comprises:

a pigment colorant; and a non-polymeric fluorophore that when excited by fluorescence-exciting radiation having a peak of at least 200 nm and up to and including 400 nm, exhibits an emission peak of at least 400 nm and up to and including 750 nm, wherein the weight ratio of the pigment colorant to the non-polymeric fluorophore in the fluorescent image is from 70:1 to 0.5:1.

2. The method of embodiment 1, wherein the non-UV fluorescing substrate is an article to be used as a security document, currency, or lottery ticket.

3. The method of embodiment 1 or 2, wherein the colored latent fluorescent image is a black latent fluorescent image, and the pigment colorant is a black pigment.

4. The method of any of embodiments 1 to 3, wherein the pigment colorant is a black pigment, and the colored latent fluorescent image exhibits a CIE L* value of 50 or less, an a* value of −20 to and including +20, and a CIE b* value of at least −15 to and including +20 when observed under illumination that excludes fluorescence-exciting wavelengths.

5. The method of any of embodiments 1 to 4, wherein the pigment colorant is an anionically-stabilized pigment.

6. The method of any of embodiments 1 to 5, wherein the non-polymeric fluorophore is colorless.

7. The method of any of embodiments 1 to 6, wherein the non-polymeric fluorophore is a diamino stilbene compound comprising multiple sulfonate groups.

8. The method of any of embodiments 1 to 7, wherein the fluorescent image further contains one or more water-soluble black dyes.

The following Examples are provided to illustrate the practice of this invention and are not meant to be limiting in any manner. The materials for which a particular commercial source is not described, can be obtained from various commercial sources that would be readily apparent to one skilled in the art.

The following specific materials were used in the following examples. All other materials used in the following examples were obtained from various commercial sources.

The non-polymeric fluorophores FA-1, FA-2, and FA-3 used in the working examples are identified by structures as follows:

FA-1

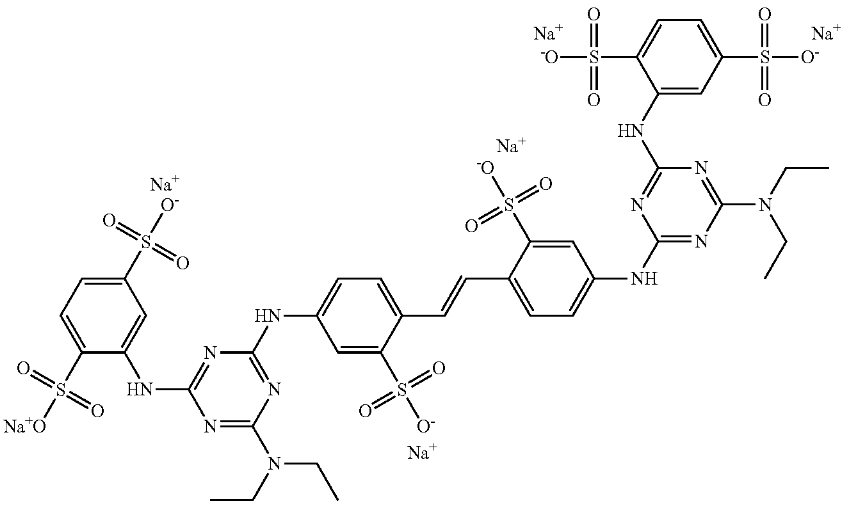

CAS Number 41098-56-0

1,4-benzenedisulfonic acid, 2,2'-[1,2-ethenediylbis[(3-sulfo-4,1-phenylene)imino[6-(diethylamino)-1,3,5-triazine-4,2-diyl]imino]]bis-, hexasodium salt (commercially available as TINOPAL® SFP).

FA-2

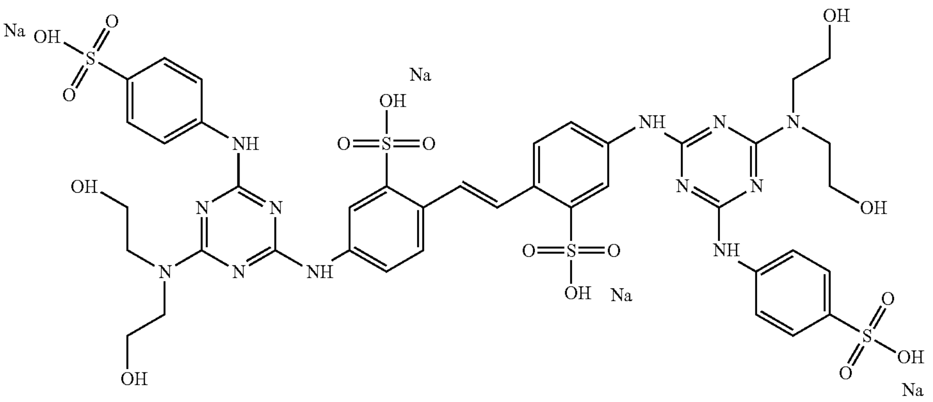

CAS Number 16470-24-9

5-[[4-[bis(2-hydroxyethyl)amino]-6-(4-sulfonatoanilino)-1,3,5-triazin-2-yl]amino]-2-[(E)-2-[4-[[4-[bis(2-hydroxyethyl)amino]-6-(4-sulfonatoanilino)-1,3,5-triazin-2-yl]amino]-2-sulfonatophenyl]ethenyl]benzenesulfonate, tetrasodium salt (commercially available from various sources as Fluorescent Brightener 220).

FA-3

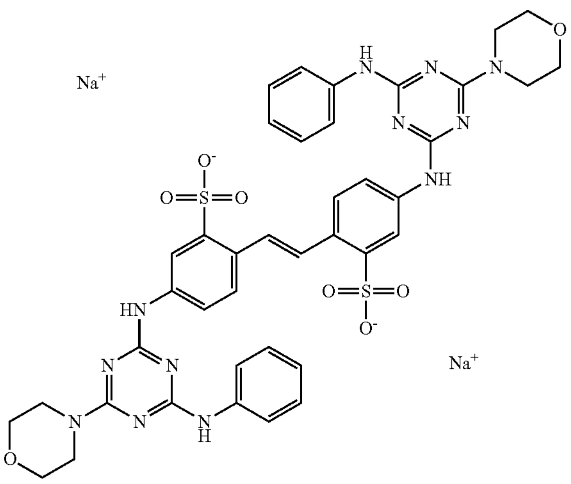

CAS Number 16090-02-1

2,2'-stilbenedisulfonic acid, 4,4'-bis((4-anilino-6-morpholino-s-triazin-2-yl)amino)-, disodium salt (available from various commercial sources as Fluorescent Brightener 71).

"Direct Black Dye" is a water-soluble dye and can be obtained for example for Colorant Solutions under the designation DB-168.

"MDEA acetate" represents methyl diethanol ammonium acetate and can be obtained by mixing the appropriate molar amounts of methyldiethanolamine and acetic acid.

Cobratec® TT-50S is a corrosion inhibitor that can be obtained from PMC Specialties Group.

Proxel® GXL is a biocide that can be obtained from various commercial sources.

Surfynol® 440 is a nonionic surfactant that can be obtained from Evonik Industries.

Surfynol® DF110L is a defoaming agent that can be obtained from Evonik Industries.

"TEG" represents triethylene glycol and can be obtained from various commercial sources.

Glycerol can be obtained from various commercial sources.

The anionically-charged "polyurethane" dispersion polymer can be prepared using the teaching in U.S. Pat. No. 8,430,492 (noted above).

Solution polymer "SA" represents an anionically-charged styrene-acrylic acid copolymer that can be obtained from BASF.

Solution polymer "PVP" refers to poly(vinyl pyrrolidone) that can be obtained from various commercial sources.

The Polymer Dispersant P-1 is an acrylic polymer dispersant that was obtained by preparation using the synthetic method described in Example 1 of U.S. Patent Application Publication 2007/0043144 (House et al.), the disclosure of which is incorporated herein by reference in its entirety.

The P-2 Active Component is the anionically-charged polyurethane described above.

The P-3 Active Component is the anionically charged styrene-acrylic acid copolymer described above.

All of the examples of aqueous colored pigment-based inks described below labeled with "Inv" are inventive while examples labeled with "C" are comparative (outside the present invention).

Aqueous Pigment Dispersions

Black Pigment Dispersion KD-1:

In a 10-liter mixing vessel, were added water (1,000 g) and a solution of Polymeric Dispersant P-1 (1,000 g of a 19.9 weight % solution). Stirring was initiated using a 10.2 cm, ring-style disperser impeller (Hockmeyer Equipment Corp. D-Blade), driven by a high shear mixer, centered 5 cm above the bottom of the mixing vessel. Cabot Corp. BLACK PEARLS® 900 carbon black pigment (500 g) was slowly added to the stirred mixture. Milling media (3000 g) comprising beads of polystyrene resin with an average particle diameter of 50 μm was added slowly while increasing impeller speed. The resulting black pigment-containing mixture was milled for 20 hours with an impeller blade tip speed of about 19 msec at an internal temperature of 25-35° C.

The dispersion/media milling mixture was then diluted with a solution of water (1,667 g) to a final black pigment concentration of 12 weight %, a polymeric dispersant concentration of 4.8 weight %, and a theoretical dispersion batch size of about 4,167 g. The impeller was removed, and the milling media was separated from the black pigment-containing dispersion by filtration. An additional filtration through a 0.3-μm Pall Corp. PROFILE II® depth filter gave approximately 4 kg of black pigment-containing dispersion.

The black pigment dispersion particle size was determination by a Microtrac, Inc., NANOTRAC® NPA 150 dynamic light scattering particle size analyzer to have a volume-weighted $50^{th}$ percentile particle size distribution diameter of about 55 nm, and a $95^{th}$ percentile particle size distribution diameter of about 99 nm.

Cyan Pigment Dispersion CD-1:

Pigment Dispersion CD-1 is an aqueous dispersion containing 12 weight % of PB15/4 cyan pigment (obtained from Sun Chemical) and 6-9 weight % of polymer dispersant P-1 having a weight average molecular weight of 9000 and was prepared as described in Example 1 of U.S. Patent Application Publication 2007/0043144 (noted above).

Yellow Pigment Dispersion YD-1:

Pigment Dispersion YD-1 is an aqueous dispersion containing 12 weight % of Yellow Pigment 74 (obtained from Sun Chemical) and 3-4 weight % of polymer dispersant P-1 having a weight average molecular weight of 9000 and was prepared as described in Example 1 of U.S. Patent Application Publication 2007/0043144 (noted above).

Magenta Pigment Dispersion MD-1:

Pigment Dispersion MD-1 is an aqueous dispersion containing 12 weight % of Cinquasia magenta pigment (obtained from BASF) and 3-5 weight % of polymer dispersant P-1 having a weight average molecular weight of 9000 and was prepared as described in Example 1 of U.S. Patent Application Publication 2007/0043144 (noted above).

Preparation of Aqueous Colored Pigment-Based Inks

Preparation of Aqueous Black Pigment-Based Inks:

All aqueous black pigment-based inks described below (both Inventive aqueous black pigment-based inks that are capable of fluorescence according to the present invention and Comparative aqueous black pigment-based inks that are outside the present invention) were prepared using Black Pigment dispersion KD-1 described above that was combined with the components in TABLE I shown below, at the listed relative proportions. In a representative procedure, 2.0 kg of each aqueous black pigment-based ink were prepared by adding the components of TABLE I to a 2-liter high density polyethylene or stainless-steel vessel using a 2-inch (5.1 cm) overhead impeller or a 1-inch (2.54 cm) magnetic stir bar rotating at about 500 rpm to provide good mixing. The components were added in the functional component order listed in TABLE I. Each resulting aqueous black pigment-based ink was mixed for approximately 2 minutes between component additions, and then the final mixture was stirred for 1 hour after the addition of all components. Each aqueous black pigment-based ink was filtered through a 1-inch (2.54 cm) Pall Corp. 0.45 μm ULTIPOR® N66 cartridge filter at a rate of 0.2-0.5 liter/min/inch of media (equivalent to 0.079-0.20 liter/min/cm of media).

Thus, the following TABLE I shows the compositions of both Inventive ("Inv") and Comparative ("C") aqueous black pigment-based inks.

TABLE I

| Function | Component | Inv-1 weight % | Inv-2 weight % | Inv-3 Weight % | Inv-4 Weight % | Inv-5 Weight % | Inv-6 Weight % | C-1 Weight % | C-2 Weight % |
|---|---|---|---|---|---|---|---|---|---|
| Vehicle | Water | 38.85 | 38.85 | 38.85 | 39.1 | 39.35 | 51.37 | 39.85 | 52.12 |
| Amine Salt | MDEA acetate | 2.50 | 2.50 | 2.50 | 2.50 | 2.50 | 2.50 | 2.50 | 2.50 |
| Humectant | Glycerol | 6.00 | 6.00 | 6.00 | 6.00 | 6.00 | 8.50 | 6.00 | 8.50 |
| Pigment Dispersion | KD-1 | 48.00 | 48.00 | 48.00 | 48.00 | 48.00 | 33.80 | 48.00 | 33.80 |
| Dispersion Polymer | P-2 Active Component | 1.50 | 1.50 | 1.50 | 1.50 | 1.50 | 1.80 | 1.50 | 1.80 |
| Solution Polymer | P-3 Active Component | 0 | 0 | 0 | 0 | 0 | 0.90 | 0 | 0.90 |
| Aqueous Dye | Direct Black Dye | 1.50 | 1.50 | 1.50 | 1.50 | 1.50 | 0.00 | 1.50 | 0.00 |
| Non-polymeric fluorophore | FA-1 | 1.00 | 0 | 0 | 0.75 | 0.50 | 0.75 | 0 | 0 |
| Non-polymeric fluorophore | FA-2 | 0 | 1.00 | 0 | 0 | 0 | 0 | 0 | 0 |
| Non-polymeric fluorophore | FA-3 | 0 | 0 | 1.00 | 0 | 0 | 0 | 0 | 0 |
| Corrosion Inhibitor | Cobratec ® TT-50S | 0.10 | 0.10 | 0.10 | 0.10 | 0.10 | 0.10 | 0.10 | 0.10 |
| Preservative | Proxel ® GXL | 0.20 | 0.20 | 0.20 | 0.20 | 0.20 | 0.10 | 0.20 | 0.10 |
| Surfactant | Surfynol ® 440 | 0.35 | 0.35 | 0.35 | 0.35 | 0.35 | 0.18 | 0.35 | 0.18 |

Each of the Inventive (Inv) and Comparative (C) aqueous black pigment-based inks shown in TABLE I were evaluated by inkjet printing a step wedge on a sample of a non-UV fluorescing security paper, typical of that used for lottery tickets, as well as drawdowns using a Gardco ACCU-LAB Drawdown Machine using a number 3 wire-wound rod on a digital book paper, to form black latent fluorescent images on the non-UV fluorescing security paper samples. Such applied black latent fluorescent images on the non-UV fluorescing security paper samples thus formed both Inventive articles according to the present invention and Comparative articles outside the scope of the present invention. When viewed under UV-illumination using a commercially available UV lamp all of the black latent fluorescent images on the Inventive articles appeared to glow (fluoresce) bluish white to varying degrees, but under the UV-illumination, the black latent fluorescent images on the Comparative article samples appeared black (no apparent latent fluorescent images). The 100% laydown patch for each of the applied black latent fluorescent images was evaluated for fluorescence using a Perkin-Elmer LS-50B Fluorescence Spectrophotometer to provide exciting radiation of 365 nm, to characterize each black latent fluorescent image obtained from the respective aqueous black pigment-based inks from TABLE I. The following testing conditions were used in this analysis:

Illuminant: Pulsed Xenon

Slit Width: Emission: 2.5 nm; Excitation: 2.5 nm

Scanning Speed: 250 nm/min

Excitation Wavelength: 365 nm

FIG. 1 shows the emission spectra observed for each of Inventive Examples Inv-1, Inv-4, and Inv-5, all containing non-polymeric fluorophore FA-1, as well as for Comparative Example C-1 that was identical to Inventive Examples Inv-1, Inv-4, and Inv-5 except that it did not contain non-polymeric fluorophore FA-1. It can be seen from FIG. 1 that even Inventive Example Inv-5, which contained only 0.5 weight % of non-polymeric fluorophore FA-1, exhibited a strong emission between 400 and 500 nm compared to Comparative Example C-1, for which no emission was observed. Increasing the concentration to 0.75 weight % (Inventive Example Inv-4) of the non-polymeric fluorophore produced a stronger emission spectrum in the resulting black latent fluorescent image but increasing the amount to 1.0 weight % (Invention Example Inv-1) showed only a small additional increase in the strength of the emission spectrum for the black latent fluorescent image obtained from the aqueous black pigment-based ink.

Figure 2:
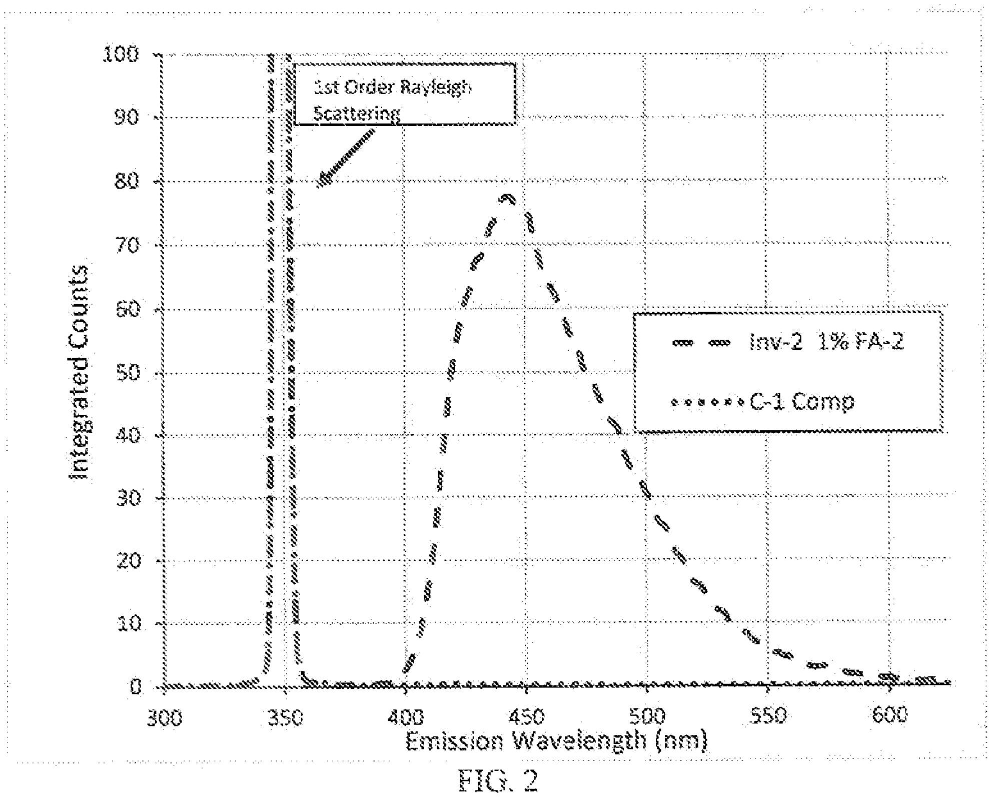
FIG. 2 also is a graphical representation of spectral emission obtained from black latent fluorescent images obtained in the working examples by printing specific inventive and comparative aqueous black pigment-based inks and irradiation with ultraviolet light.

FIG. 2 shows emission spectra obtained for Inventive Example Inv-2 containing non-polymeric fluorophore FA-2, as well as for Comparative Example C-1 that was identical to Inventive Example Inv-2 except that it did not contain non-polymeric fluorophore FA-2. This shows that non-polymeric FA-2 was also effective at producing a strong fluorescence emission spectrum in the black latent fluorescent image.

Figure 3:
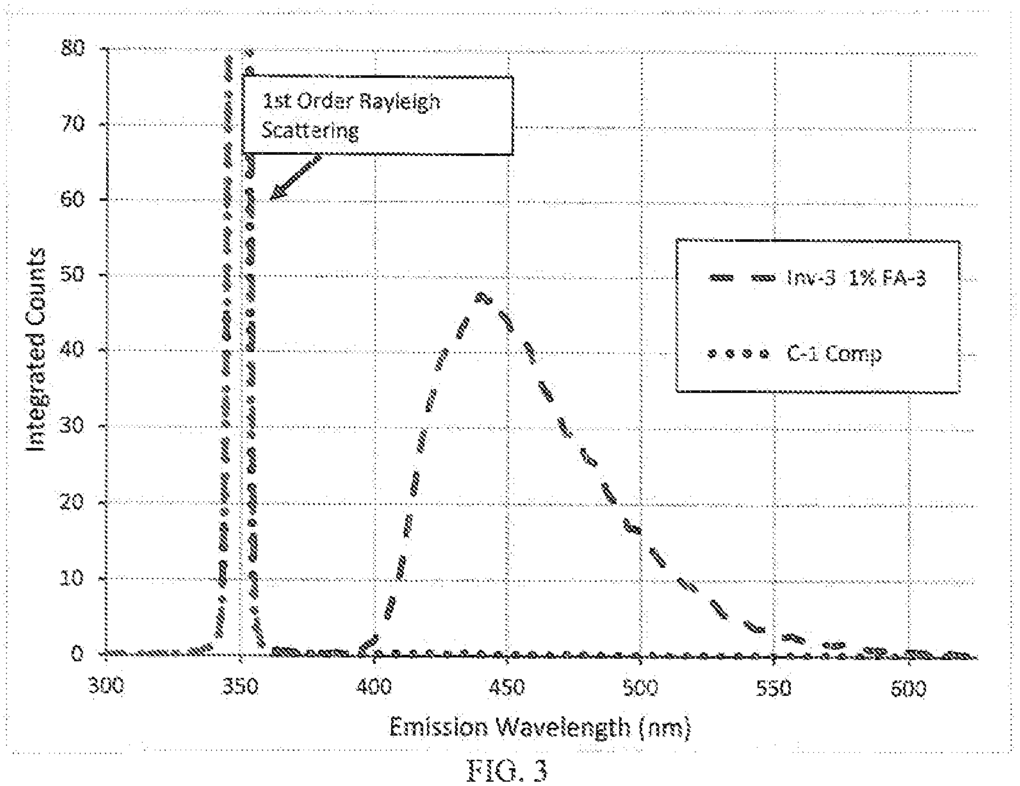
FIG. 3 also is a graphical representation of spectral emission data obtained from black latent fluorescent images obtained in the working examples by printing specific inventive and comparative aqueous black pigment-based inks and irradiating with ultraviolet light.

FIG. 3 shows emission spectra obtained for Inventive Example Inv-3 containing non-polymeric fluorophore FA-3 as well as for Comparative Example C-1 that is identical to Inventive Example Inv-3 except that it did not contain non-polymeric fluorophore FA-3. The results show that non-polymeric fluorophore FA-3 was also effective at producing a strong fluorescence emission spectrum in the black latent fluorescent image.

Figure 4:
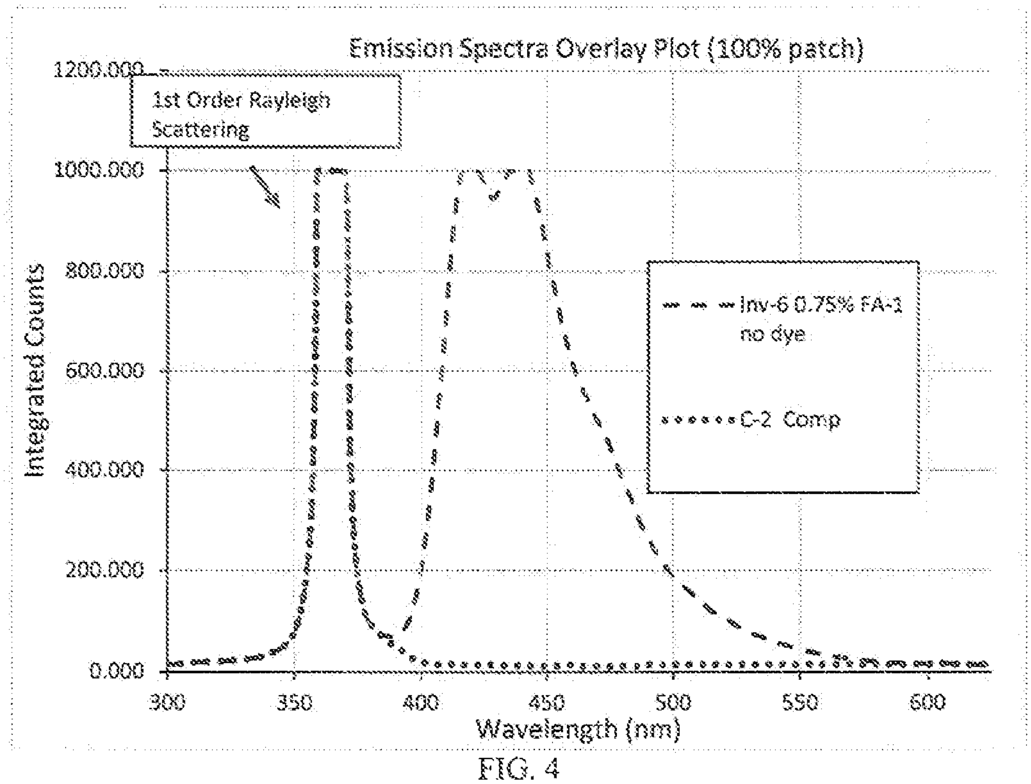
FIG. 4 also is a graphical representation of spectral emission data obtained from black latent fluorescent images obtained in the working examples by printing specific inventive and comparative aqueous black pigment-based inks and irradiating with ultraviolet light.

FIG. 4 shows emission spectra obtained from Inventive Example Inv-6 containing non-polymeric fluorophore FA-1 in an aqueous black pigment-based ink having no added black dye, as well as Comparative Example C-2 that was identical to Invention Example Inv-6 except that it did not contain non-polymeric fluorophore FA-1. These results show that without added black dye, the emission spectrum of non-polymeric fluorophore FA-1 was approximately four times stronger than in Invention Example Inv-4 that contained the same amount of non-polymeric fluorophore FA-1 but also contained 1.5 weight % of the black dye.

The printed Inventive and Comparative samples were also qualitatively evaluated for darkness and wet rub resistance, and all were found to exhibit satisfactory performance.

Preparation of Aqueous Cyan, Yellow, and Magenta Pigment-Based Inks:

Inventive aqueous colored pigment-based inks that are capable of fluorescence, with non-black pigment colorants were also prepared to demonstrate the desired objectives of the present invention. These Inventive aqueous colored pigment-based inks (Inv-7, Inv-8, and Inv-9) were prepared using the components described in TABLE II below that were combined using a process like that described above for the aqueous black pigment-based inks.

TABLE II

| Function | Component | Inv-7 Weight % | Inv-8 Weight % | Inv-9 Weight % |
|---|---|---|---|---|
| Vehicle | Water | 76.2 | 59.0 | 66.8 |
| Humectant | Glycerol | 4.0 | 6.5 | 0 |
| Humectant | TEG | 0 | 0 | 5.0 |
| Pigment Dispersion | CD-1 | 16.7 | 0 | 0 |
| Pigment Dispersion | MD-1 | 0 | 31.7 | 0 |
| Pigment Dispersion | YD-1 | 0 | 0 | 25.0 |
| Dispersion Polymer | Polyurethane | 1.0 | 1.5 | 1.0 |
| Solution Polymer | SA or PVP | 1.0 | 0 | 1.0 |
| Non-polymeric Fluorophore | FA-1 | 0.75 | 0.75 | 0.75 |
| Corrosion Inhibitor | Cobratec® TT-50S | 0.1 | 0.1 | 0.1 |
| Preservative | Proxel® GXL | 0.1 | 0.1 | 0.1 |
| Surfactant | Surfynol® 440 | 0.1 | 0.22 | 0.08 |
| Defoamer | Surfynol® F110L | 0.1 | 0.1 | 0.2 |

The inventive aqueous colored pigment-based inks shown in Table II containing non-black pigment colorants also exhibited the fluorescent properties of the invention when drawdowns or printed samples (latent colored fluorescent images) on non-UV fluorescent substrates were viewed under a commercially available UV lamp. In each case, the observed fluorescence in the colored latent fluorescent image was bluish white in color, and was not the color of the aqueous colored pigment-based ink that had been applied.

Samples prepared in the same manner with comparative cyan, magenta, and yellow aqueous pigment inks without added non-polymeric fluorophore appeared dark in color and did not exhibit any fluorescence when viewed under the same commercially available UV lamp. These inks are commercially available from Eastman Kodak Company as KODAK PROSPER Press Pigment Cyan, Magenta, and Yellow inks, respectively.

The following Examples illustrate the practice of the present invention using a commercial DOD inkjet printer (described below) and are not meant to be limiting in any manner. The materials used in these examples for which a particular commercial source is not identified, can be obtained from various commercial sources that would be readily apparent to one skilled in the art.

Each of the Inventive (Inv; capable of fluorescence) and Comparative (C; not capable of fluorescence) aqueous black pigment-based inks shown in TABLE I above were evaluated by inkjet printing some random text and a step wedge on three different substrates. Each aqueous black pigment-based ink was loaded into a T0441 compatible aftermarket refillable ink cartridge marketed by InkOwl.com and inkjet-printed on samples of each of three substrates using an Epson Stylus C86 printer. Substrate 1 was a plain paper known in the trade as Data Speed Laser. Substrate 2 was a non-UV fluorescing security paper, typical of that used for lottery tickets. Substrate 3 comprised a clear poly(ethylene terephthalate) film known in the trade as LPX-2 that had been coated on the surface to be inkjet-printed with a primer commercially available from Eastman Kodak Company as KODAK PROSPER PRESS 2-Part Film Optimizer Agent.

Substrate 1 contained typical optical brighteners that fluoresce brightly under UV illumination. This fluorescent emission effectively washed out any fluorescence to be provided from a colored latent fluorescent image that could be provided from the Inventive aqueous black pigment-based inks, making them appear the same as the non-fluorescing colored images provided from the Comparative aqueous pigment-based inks under UV illumination. Under normal visible light having no appreciable UV component, all the inkjet-printed image samples (from both Inventive and Comparative aqueous black pigment-based inks) appeared black. It should be understood for these experiments that the optical brighteners within Substrate 1 emitted at the same wavelength as the non-polymeric fluorophores present in the aqueous black pigment-based inks of the present invention, but one would reasonably expect to see a distinctive emission from aqueous colored pigment-based inks of the present invention if the wavelength of the colored latent fluorescent image emission had been different than the wavelength of emission from Substrate 1.

Substrate 2 did not contain any optical brighteners, and so under UV illumination, all of the black latent fluorescent images obtained from the Inventive aqueous colored pigment-based inks appeared to glow (fluoresce) bluish white to varying degrees while the colored images obtained from the Comparative aqueous black pigment-based inks merely appeared black. Under normal visible light without any appreciable UV component, all color images, colored latent fluorescent images or not, appeared black.

Substrate 3 also did not contain any optical brighteners, and under UV illumination all the black latent fluorescent images obtained from Inventive aqueous black pigment-based inks appeared to glow (fluoresce) bluish white from the front side while the color images obtained from the Comparative aqueous black pigment-based inks simply appeared black. When the backside of Substrate 3 was illuminated with UV radiation, the black latent fluorescent images obtained from the Inventive aqueous black pigment-based inks appeared completely bluish white to the point where no underlying black density could be detected. Under equal lighting on the back side, all the color images obtained from the Comparative aqueous black pigment-based inks appeared black in color. Under normal visible light without any appreciable UV component, all color images, latent fluorescent images or not, appeared black from both the front side and back side of Substrate 3.

The invention has been described in detail with particular reference to certain preferred embodiments thereof, but it will be understood that variations and modifications can be achieved within the spirit and scope of the invention.

The invention claimed is:

1. A method of detecting a fluorescent image. comprising: irradiating a black latent fluorescent image disposed on a non-UV fluorescing substrate, the black latent fluorescent image having an emission peak of at least 400 nm and up to and including 750 nm, on an outer surface of a non-UV fluorescing substrate, with fluorescence-exciting radiation having a peak of at least 200 nm and up to and including 400 nm, wherein the black latent fluorescent image comprises:

a non-UV fluorescing, anionically-stabilized black pigment colorant; and a colorless, water-soluble, non-polymeric fluorophore that when excited by fluorescence-exciting radiation having a peak of at least 200 nm and up to and including 400 nm, exhibits an emission peak of at least 400 nm and up to and including 750 nm, wherein the weight ratio of the non-UV fluorescing, anionically-stabilized black pigment colorant to the colorless, water-soluble, non-polymeric fluorophore in the black latent fluorescent image is from 70:1 to 0.5:1.

2. The method of claim 1, wherein the non-UV fluorescing substrate is an article to be used as a security document, currency, or lottery ticket.

3. The method of claim 1, wherein the black latent fluorescent image exhibits a CIE L* value of 50 or less, an a value of −20 to and including +20, and a CIE b* value of at least −15 to and including +20 when observed under Illumination that excludes fluorescence-exciting wavelengths.

4. The method of claim 1, wherein the colorless, water soluble non-polymeric fluorophore is a diamino stilbene compound comprising multiple sulfonate groups.

5. The method of claim 1, wherein the black fluorescent latent image further contains one or more water-soluble black dyes for enhancing the black density of the black fluorescent latent image.

6. The method of claim 1, wherein the black latent fluorescent image is disposed on the non-UV fluorescing substrate over a non-fluorescent, non-black monochrome or multicolored image.

7. The method of claim 1, wherein the black latent fluorescent image is disposed on a matte surface of the non-UV fluorescing substrate that has an opacity of at least 50% and an a* value of a least −3 and to and including +3, and a b* value of at least −3 to and up to +3 when observed under illumination that excludes fluorescence-exciting wavelengths.

8. The method of claim 1, wherein the non-UV fluorescing substrate further comprises a non-fluorescent colorless image thereon.

9. The method of claim 1, wherein the colorless. water-soluble, non-polymeric fluorophore is one or more of 1,4-benzenedisulfonic acid, 2,2'-[1,2-ethenediylbis](3-sulfo-4,1-phenylene)imino [6-(diethylamino)-1,3,5-triazine-4,2-diyl]imino]]bis-, hexasodium salt: 5-[[4-[bis(2-hydroxyethyl)amino]-6-(4-sulfonatoanilino)-1,3,5-triazin-2-yl]amino]-2-[(E)-2-[4-[[4-[bis(2-hydroxyethyl)amino]-6-(4-sulfonatoanilino)-1,3,5-triazin-2-yl]amino]-2-sulfonatophenyl]ethenyl]benzenesulfonate, tetrasodium salt; and 2,2'-stilbenedisulfonic acid, 4,4'-bis ((4-anilino-6-morpholino-s-triazin-2-yl) amino)-, disodium salt.

* * * * *